(12) United States Patent
Gadkaree et al.

(10) Patent No.: US 9,478,364 B2
(45) Date of Patent: Oct. 25, 2016

(54) CARBON-BASED ELECTRODES CONTAINING MOLECULAR SIEVE

(71) Applicant: Corning Incorporated, Corning, NY (US)

(72) Inventors: Kishor Purushottam Gadkaree, Painted Post, NY (US); Atul Kumar, Horseheads, NY (US); Xiaorong Liu, Oneonta, NY (US)

(73) Assignee: Corning Incorporated, Corning, NY (US)

( * ) Notice: Subject to any disclaimer, the term of this patent is extended or adjusted under 35 U.S.C. 154(b) by 262 days.

(21) Appl. No.: 14/166,550

(22) Filed: Jan. 28, 2014

(65) Prior Publication Data

US 2015/0055276 A1    Feb. 26, 2015

Related U.S. Application Data

(60) Provisional application No. 61/868,862, filed on Aug. 22, 2013.

(51) Int. Cl.
| | |
|---|---|
| *H01G 11/32* | (2013.01) |
| *H01G 11/28* | (2013.01) |
| *H01G 11/86* | (2013.01) |
| *H01G 11/26* | (2013.01) |
| *H01G 11/38* | (2013.01) |

(52) U.S. Cl.
CPC .............. *H01G 11/32* (2013.01); *H01G 11/26* (2013.01); *H01G 11/28* (2013.01); *H01G 11/38* (2013.01); *H01G 11/86* (2013.01); *Y02E 60/13* (2013.01); *Y02T 10/7022* (2013.01)

(58) Field of Classification Search
None
See application file for complete search history.

(56) References Cited

U.S. PATENT DOCUMENTS

| | | | | |
|---|---|---|---|---|
| 4,865,931 | A | * | 9/1989 | McCullough, Jr. ...... D01F 9/155 423/447.2 |
| 7,583,494 | B2 | | 9/2009 | Maeshima .................... 361/502 |
| 7,771,496 | B1 | | 8/2010 | Nakahara et al. |
| 2003/0202316 | A1 | * | 10/2003 | Kawasato .............. H01G 9/038 361/502 |
| 2009/0027827 | A1 | | 1/2009 | Siggel et al. ................. 361/502 |
| 2009/0321678 | A1 | | 12/2009 | Zhong et al. .............. 252/182.1 |
| 2012/0043120 | A1 | | 2/2012 | Gadkaree et al. |

FOREIGN PATENT DOCUMENTS

| | | | |
|---|---|---|---|
| EP | 2525377 | * | 11/2012 |
| EP | 2592674 | | 5/2013 |
| WO | 2012/069320 | | 5/2012 |

OTHER PUBLICATIONS

Machine Translation of JP2012-182263.
PCT/US2014/051775 Search Report.

* cited by examiner

*Primary Examiner* — Dion R Ferguson
(74) *Attorney, Agent, or Firm* — John L. Haack; Michael W. Russell

(57) ABSTRACT

Carbon-based electrodes such as for incorporation into ultracapacitors or other high power density energy storage devices, include activated carbon, carbon black, binder and at least one molecular sieve material. The molecular sieve component can adsorb and trap water, which can facilitate the use of the device at higher voltage, such as greater than 3V. The molecular sieve material may be incorporated into the carbon-based electrodes or formed as a layer over a carbon-based electrode surface.

25 Claims, 9 Drawing Sheets

CARBON-BASED ELECTRODES CONTAINING MOLECULAR SIEVE

CROSS-REFERENCE TO RELATED APPLICATIONS

This application claims the benefit of priority under 35 U.S.C. §119 of U.S. Application Ser. No. 61/868,862 filed on Aug. 22, 2013, the entire content of which is hereby incorporated by reference.

BACKGROUND

1. Field

The present disclosure relates generally to carbon-based electrodes for energy storage devices, and more specifically to carbon-based electrodes that contain particles of one or more molecular sieve material and their related methods of fabrication.

2. Technical Background

Energy storage devices such as ultracapacitors may be used in a variety of applications such as where a discrete power pulse is required. Example applications range from cell phones to hybrid vehicles. Ultracapacitors also known as electrochemical double layer capacitors (EDLCs) have emerged as an alternative or compliment to batteries in applications that require high power, long shelf life, and/or long cycle life. Ultracapacitors typically comprise a porous separator and an organic electrolyte sandwiched between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes.

Carbon-based electrodes suitable for incorporation into energy storage devices are known. Activated carbon is widely used as a porous material in ultracapacitors due to its large surface area, electronic conductivity, ionic capacitance, chemical stability, and/or low cost. Activated carbon can be made from synthetic precursor materials such as phenolic resins, or natural precursor materials such as coals or biomass. With both synthetic and natural precursors, the activated carbon can be formed by first carbonizing the precursor and then activating the intermediate product. The activation can comprise physical (e.g., steam) or chemical activation at elevated temperatures to increase the porosity and hence the surface area of the carbon. The carbon-based electrodes can include, in addition to activated carbon, a conductive carbon such as carbon black, and a binder such as polytetrafluoroethylene (PTFE) or polyvinylidene fluoride (PVDF). The activated carbon-containing layer (carbon mat) is typically laminated over a current collector to form the carbon-based electrode.

The choice of separator and electrode materials directly affect the performance of the device, including the achievable energy density and power density. The energy density (E) of an EDLC is given by $E = \frac{1}{2} CV^2$, where C is the capacitance and V is the device's operating voltage. Recently, engineered carbon materials have been developed to achieve higher capacitance. To achieve higher capacitance, activated carbon materials with high surface area (500-2500 $m^2/g$) may be used.

A further approach to increasing the energy density is to increase the capacitor's operating voltage. In this regard, aqueous electrolytes have been used in EDLCs for lower voltage (<1V) operation, while organic electrolytes have been used for higher voltage (2.3-2.7 V) devices. However, to achieve even higher energy densities, there is a need to increase the voltage envelop from conventional values of about 2.7 V to around 3.0 V. Such an increase from 2.7 to 3.0 V will result in a 23% increase in the energy density.

Thus, in order to realize higher energy densities and higher power densities, next generation EDLCs will likely operate at high applied voltages. It may be desirable, therefore, to minimize unwanted Faradaic reactions between the activated carbon and the liquid electrolyte, particularly at the higher potentials.

Accordingly, it would be advantageous to minimize these Faradaic reactions by minimizing, for example, the water content in carbon-based electrodes and the attendant carbon materials for operation at high voltages. The activated carbon materials can possess a high surface area to volume ratio and minimal reactivity, particularly with the organic electrolyte at elevated voltages, and can be used to form carbon-based electrodes that enable efficient, long-life and high energy density devices.

BRIEF SUMMARY

In accordance with embodiments of the present disclosure, carbon-based electrodes such as for incorporation into ultracapacitors or other high power density energy storage devices, include a carbon mat comprising activated carbon, carbon black, binder and at least one molecular sieve material disposed adjacent to a current collector. The molecular sieve component can adsorb and trap water, which can facilitate the use of the device at higher voltage, such as greater than 2.7V or greater than 3V. The molecular sieve material may be incorporated into the carbon mat or formed as a layer over a surface of the carbon mat.

In related embodiments, polyvinylidene fluoride (PVDF) binder can be incorporated into at least one carbon-based electrode, e.g., the positive electrode and/or the negative electrode. Durability of the electrodes, and in particular the negative electrode, may be improved by the choice of binder. It has been shown that PVDF-containing electrodes are less prone to Faradaic breakdown than PTFE-containing electrodes. In further related embodiments, a high-purity, thermally-grown carbon layer can be used as an alternative to conductive ink as a conductive layer between the carbon mat and the current collector. A thermally-grown carbon layer is free of a binder.

A carbon-based electrode in embodiments comprises a carbon-based layer that includes activated carbon, carbon black and binder. The carbon-based electrode further comprises (i) a layer comprising at least one molecular sieve material disposed adjacent to at least a portion of the carbon-based layer, or (ii) at least one molecular sieve material incorporated throughout the carbon-based layer, or both (i) and (ii).

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
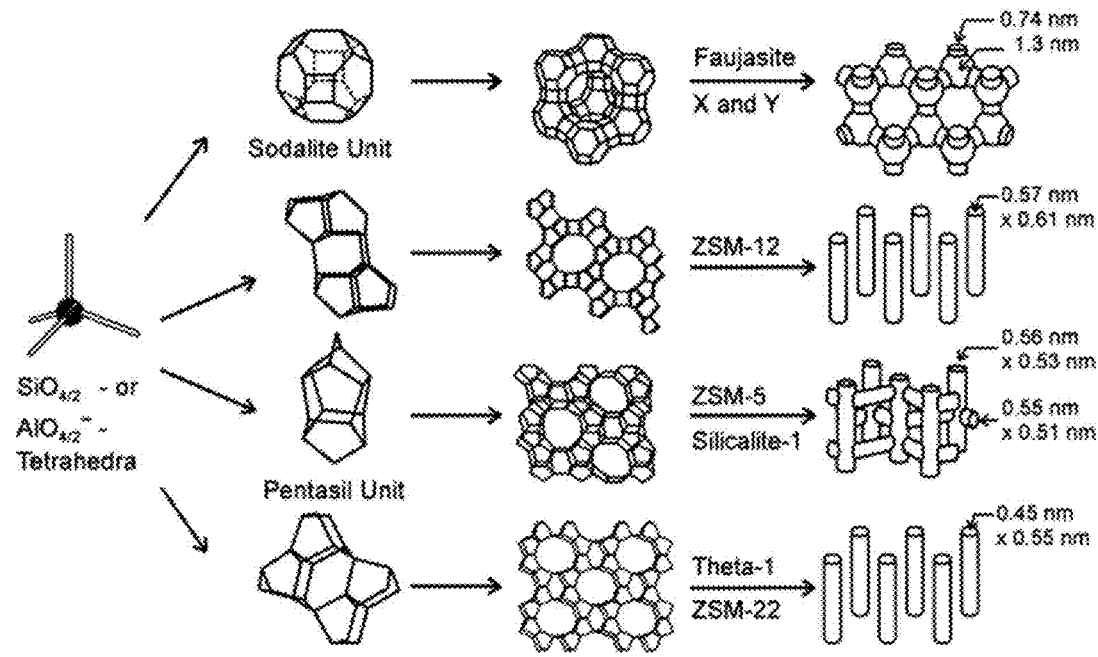
FIG. 1 is a schematic diagram of example zeolite materials according to various embodiments.

Reference will now be made in greater detail to various embodiments of the subject matter of the present disclosure, some embodiments of which are illustrated in the accompanying drawings. The same reference numerals will be used throughout the drawings to refer to the same or similar elements.

Operation at higher voltages subjects the EDLC components to several different types of stresses that may lead to faster deterioration of the device. Such stresses include, for example, mechanical stresses on the electrodes due to movement of charged ions back-and-forth into the pores of the activated carbon, and chemical stresses due to generation of by-product gases as well as chemical degradation. The chemical stresses are in most part due to Faradic charge transfer processes in the cell.

These Faradic charge transfer processes manifest as oxidation and reduction reactions at each of the positive and negative electrode of the EDLC. It is believed that the properties of the activated carbon impact the Faradic reactions. More specifically, the surface area, surface functional groups and the porosity and pore size distribution of the activated carbon can affect the performance of the cell.

At such higher operating voltages (>2.7V), the presence of water within the cell can be detrimental to the cell's performance. Both oxidation and reduction reactions may be accelerated by the presence of water. Activated carbon typically comprises water within its pores. This water is difficult to remove. Moreover, a significant portion of adsorbed water is decomposed at potentials above about 2V creating hydrogen. As these decomposition reactions continue more and more hydrogen is generated, in addition to other byproducts that may contaminate the electrodes. Hydrogen pressure may eventually lead to leaks and ultimately failure of the device.

At the negative electrode, water may be electrochemically reduced to $H_2$ and $OH^-$ as follows:

$$H_2O + e^- \rightarrow H^* + OH^- \rightarrow \tfrac{1}{2}H_2 + OH^- \tag{1}$$

$$H_2O + \tfrac{1}{2}O_2 + 2e^- \rightarrow 2OH^- \tag{2}$$

The $OH^-$ ion can initiate Huffman degradation of the electrolyte cation as follows:

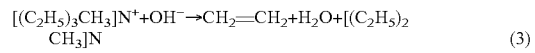
$$[(C_2H_5)_3CH_3]N^+ + OH^- \rightarrow CH_2=CH_2 + H_2O + [(C_2H_5)_2CH_3]N \tag{3}$$

The $H_2$ gas or H radicals can add to ethylene gas to generate ethane:

$$CH_2=CH_2 + H_2 \rightarrow C_2H_6 \tag{4}$$

The water generated in Huffman degradation can re-enter the scheme at equation (1) while the OH— will initiate equation (3). In addition to the impact of hydrogen gas, pressure within a cell can be undesirably increased due to the formation of ethylene gas.

At the positive electrode, surface functional groups on carbon can oxidize. The desorbed water can lead to hydrolysis of the $BF^{4-}$ ion from the electrolyte to generate HF acid. The by-products can react with the aluminum current collector to produce hydrogen gas and water.

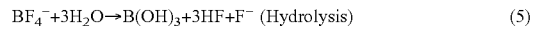
$$BF_4^- + 3H_2O \rightarrow B(OH)_3 + 3HF + F^- \text{ (Hydrolysis)} \tag{5}$$

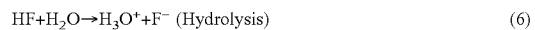
$$HF + H_2O \rightarrow H_3O^+ + F^- \text{ (Hydrolysis)} \tag{6}$$

$$Al + 3F^- \rightarrow AlF_3 + 3e^- \text{ (Oxidation)} \tag{7}$$

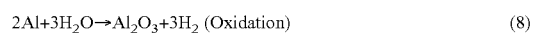
$$2Al + 3H_2O \rightarrow Al_2O_3 + 3H_2 \text{ (Oxidation)} \tag{8}$$

The HF acid can also migrate to the negative electrode and react with native oxide of the aluminum current collector to form $AlF_3$ and additional water.

$$6HF + Al_2O_3 \rightarrow 2AlF_3 + 3H_2O \tag{9}$$

Furthermore, the cellulose separator with general formula R—$CH_2$—OH can oxidize on the positive side in the presence of water leading to degradation.

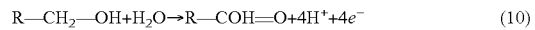
$$R-CH_2-OH + H_2O \rightarrow R-COH=O + 4H^+ + 4e^- \tag{10}$$

The H+ can migrate towards the negative electrode, where it can be reduced to produce hydrogen gas.

$$4H^+ + 4e^- \rightarrow 2H_2 \tag{11}$$

In various embodiments, a carbon-based electrode includes particles of at least one molecular sieve. The molecular sieve material may be incorporated into the carbon mat together with other components such as activated carbon, carbon black and binder, or, in alternate embodiments, the molecular sieve material may be formed as a layer on or adjacent to a surface of the carbon mat. For instance, the layer of molecular sieve material can be disposed directly adjacent to at least a portion of at least one of the carbon-based layers. The molecular sieve material can adsorb and sequester water that would otherwise detrimentally decompose or interfere with operation of the device at high voltages. In still further embodiments, a carbon-based electrode may include one or more molecular sieve material that is incorporated into the carbon mat and molecular sieve that are present as a layer on or adjacent to a surface of the carbon mat.

Example molecular sieve materials include natural and synthetic zeolites. A zeolite mineral is a crystalline substance with a structure characterized by a framework of linked tetrahedra, each including four O atoms surrounding a cation. This framework contains open cavities in the form of channels and cages. The channels and cages are large enough to allow the passage of guest species, and may be occupied by H$_2$O molecules and extra-framework cations (e.g., Na$^+$, Ca$^{2+}$, Mg$^{2+}$) that are commonly exchangeable. The framework may be interrupted by (OH,F) groups; these occupy a tetrahedron apex that is not shared with adjacent tetrahedra. Suitable zeolites may be microporous, which are characterized by an average pore size of less than 2 nm (<20 Å).

Zeolites occur naturally as minerals. Synthetic zeolites are also known. In contrast to naturally-occurring zeolites, however, synthetic zeolites can be manufactured in a uniform, phase-pure state. It is also possible to manufacture desirable zeolite structures that do not appear in nature.

The chemical composition of an example aluminosilicate zeolite can be represented by a formula of the type

where A is a cation with charge m, (x+y) is the number of tetrahedra per crystallographic unit cell, and x/y is the so-called framework silicon/aluminum ratio. Silicon and aluminum in aluminosilicate zeolites are referred to as T-atoms. The cation A can be Na$^+$, K$^+$, Ca$^{2+}$ and/or Mg$^{2+}$.

The structures of four selected zeolite materials are shown in FIG. 1 together with their respective void systems and pore dimensions. In the representations of FIG. 1, the T-atoms are located at the vertices, and the lines connecting them represent T-O-T bonds. If 24 tetrahedra are linked together as shown in the top line of FIG. 1, the cubo-octahedron, also referred to as a sodalite unit or β-cage, results. If sodalite units are connected via their hexagonal faces, the structure of the mineral faujasite is formed.

The simplest synthetic zeolite is the so-called zeolite A with a molecular ratio of one sodium cation to one silica group to one alumina group. Zeolite A synthesis produces precisely duplicated sodalite units, which have 47% open space, ion exchangeable sodium, water of hydration and electronically charged pores.

Suitable zeolites for incorporation into a carbon-based electrode are electrically non-conductive and do not trap solute or solvent from the liquid electrolyte used in the EDLC. For example, 3 A and 4 A zeolites can be used. These materials contain potassium and sodium in addition to aluminum and silicon, are characterized respectively with average pore diameters of 3 Angstroms and 4 Angstroms. 3 A molecular sieves (e.g., ⅔K$_2$O.⅓Na$_2$O.Al$_2$O$_3$. 2 SiO$_2$.9/2H$_2$O) do not adsorb chemicals whose molecular diameters are larger than 3 Å, and 4 A molecular sieves (e.g., Na$_2$O.Al$_2$O$_3$.2SiO$_2$.9/2H$_2$O) can absorb water and other materials whose critical diameter are not more than 4 Å. In embodiments, the zeolite material will capture (adsorb) water but not acetonitrile or anions or cations from the electrolyte. Such capture and adsorption can occur preferentially to the activated carbon.

By way of comparison, and in contrast to zeolites, carbon molecular sieves are not useful for incorporation into a carbon-based electrode. Carbon molecular sieves are conductive and will undesirably constitute part of the electrode upon application of a potential, which may, for example, disadvantageously lead to the disassociation of water and the formation of hydrogen gas within the device.

In one embodiment, zeolite particles are incorporated into the carbon mat in addition to activated carbon, carbon black and binder. The amount of zeolite is such that no significant deterioration in properties such as ESR or capacitance of the device takes place. Particles of a zeolite material may be uniformly or non-uniformly distributed throughout the carbon mat of the carbon-based electrode.

In a further embodiment, zeolite particles are coated with or without a binder onto a surface of the carbon mat. The coating weight and thickness can be controlled so that there is no significant deterioration in performance of the device.

In a still further embodiment, zeolite particles can be incorporated into the carbon mat and also provided as a coating over a surface of the carbon mat.

The size of zeolite crystals is typically on the order of one to several microns, though the average particle size of molecular sieve material suitable for incorporation into a carbon-based electrode or into a surface of a carbon-based electrode can range from 5 nm to 20 microns. Example zeolite crystals can have a particle size of 0.1, 0.2, 0.5, 1, 2, 5 10 or 20 microns, including particle sizes that form a range between any pair of the foregoing values.

In embodiments where molecular sieve particles are incorporated into the electrode structure, a loading of the molecular sieve particles (in weight percent of the total carbon mat) may range from 0.1% to 10%, e.g., 0.1, 0.2, 0.5, 1, 2, 5, or 10 wt. %. In related embodiments, the loading can be characterized over a range between any of the foregoing values.

Thus, a carbon-based electrode may include activated carbon, carbon black, binder and particles of one or more molecular sieve. Carbon black is added as a filler material to increase the electrical conductivity of the electrode. Example carbon mat compositions are summarized in Table 1.

TABLE 1

Electrode matrix compositions including zeolite particles

| Activated carbon (wt. %) | Carbon black (wt. %) | Binder (wt. %) | Sieve (wt. %) |
| --- | --- | --- | --- |
| 85 | 5 | 10 | 0# |
| 84.9 | 5 | 10 | 0.1 |
| 81.5 | 5 | 10 | 3.5 |
| 78 | 5 | 10 | 7.0 |
| 75 | 5 | 10 | 10 |

The molecular sieve-free example is comparative

In addition to activated carbon and carbon black, carbon-based electrodes include a binder. Example binder materials for forming the carbon-based electrode include polytetrafluoroethylene (PTFE) and polyvinylidene fluoride (PVDF). It has been shown, in some embodiments, that the choice of binder may influence the stability of the electrode.

Figure 2:
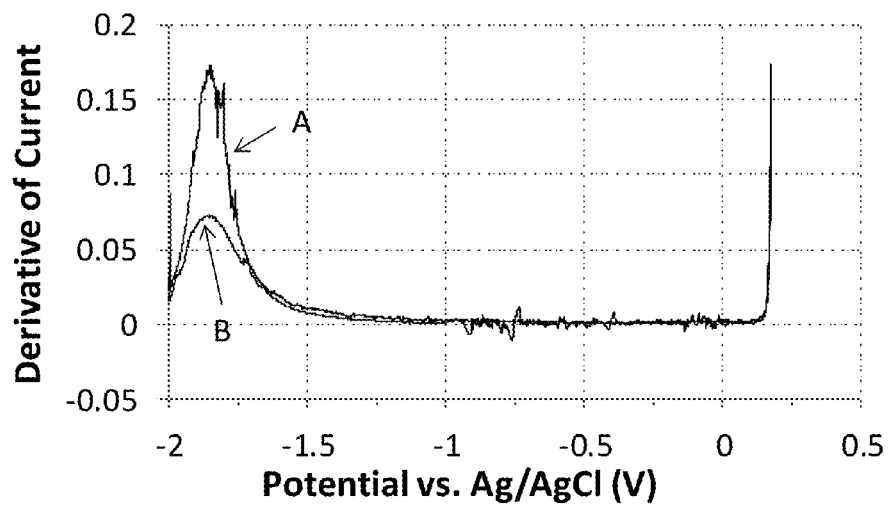
FIG. 2 is a plot of differentiated current versus electrode potential with respect to a Ag/AgCl reference electrode for PTFE and PVDF-containing carbon-based electrodes.

The stability of the negative electrode comprising different binders was evaluated using a three electrode setup, which involved polarizing the electrode to extreme potentials with respect to a Ag/AgCl reference electrode. As shown in FIG. 2, the negative electrode comprising PTFE binder (curve A) exhibits a high reduction current at about −1.8V. Without wishing to be bound by theory, this current is believed to be due to reductive decomposition of PTFE through de-fluorination. PTFE de-fluorination is believed to weaken the negative electrode matrix and lead to electrode embrittlement. Such embrittlement has been observed experimentally. It is also believed that fluorine from PTFE may react and generate HF acid within the cell. Additionally, the high irreversible reduction reaction causes the potential of positive electrode to be shifted unfavorably into the region of irreversible oxidation, further degrading the cells.

In contrast, the negative electrode comprising PVDF binder (curve B) exhibits a lesser reduction current at about −1.8V, consistent with the conclusion that PVDF is less prone to voltage-induced degradation.

Various methods can be used to form a carbon-based electrode that includes one or more molecular sieve materials. One method of making a carbon-based electrode includes forming a mixture comprising activated carbon, carbon black, binder, molecular sieve and an optional liquid. A carbon mat can be formed from the mixture, and the carbon mat can be laminated onto a suitable current collector to form a carbon-based electrode In embodiments, the components can be mixed using a shear mixer. Optionally, the mixture can include 1-20 wt. % of a carrier/solvent liquid such as isopropyl alcohol or n-methylpyrrolidone (NMP), which can facilitate adhesion of the component particles during processing as well as the formation of a thin film of the components via calendaring or casting. PVDF, for example, is soluble in NMP. A wet mixture comprising activated carbon, carbon black, binder and molecular sieve material in NMP can therefore include solid particles of the activated carbon, carbon black and the molecular sieve material, while the PVDF binder will be in solution until the solvent is removed.

In one embodiment, the temperature of the mixture is controlled, By maintaining the temperature of the mixture below a phase transition temperature of the binder, e.g., PTFE or PVDF, it is possible to improve the dispersion and distribution of the binder particles as well as the molecular sieve material in the mixture. In example methods, a temperature of the mixture during the mixing is maintained below 20° C., e.g., at about 10° C.' or 5° C.

The mixture (dry or wet) can be fibrillated, for example, in a jet mill or screw extruder. A 4 inch micronizer jet mill with a tungsten carbide lining was used for the fibrillation process in conjunction with several examples disclosed herein. The mixture, prior to loading into the jet mill, was sieved through a 10 mesh screen to remove the larger sized particles. A feed pressure of 70 psi, grind pressure of 85 psi and a feed rate of about 1000 g/hr were used for the jet mill fibrillation process.

The shear stresses created by the jet mill form fibrils of the binder material. PTFE or PVDF, for example, are fibrillated to form a network structure (of fibrils). Activated carbon particles, carbon black particles and molecular sieve particles are taken up into the network structure without being coated with the binder.

The fibrillated mixture can be calendared and laminated onto a current collector. A pair of laminates can be wound together with inter-disposed separators and packaged together with a suitable electrolyte to form an EDLC. With calendaring, the fibrillated electrode mixture is passed through a series of rollers to form a densified sheet (carbon mat). The temperature of the rollers may range from about 25-150° C., e.g., about 100° C. The fibrils formed in the fibrillation bind the activated carbon, carbon black and molecular sieve particles in the carbon mat. The application of pressure during lamination may be performed at elevated temperature, e.g., about 200° C.

In further embodiments, a slurry comprising activated carbon, carbon black, fibrillated binder, molecular sieve material and a liquid carrier or liquid solvent can be deposited (e.g., slot coated) onto a substrate to form a thin film that is dried to produce a carbon mat. The substrate may be a current collector such that the carbon-based electrode is formed in situ. The current collector may include a conductive carbon layer onto which the slurry is deposited.

Figure 3A:
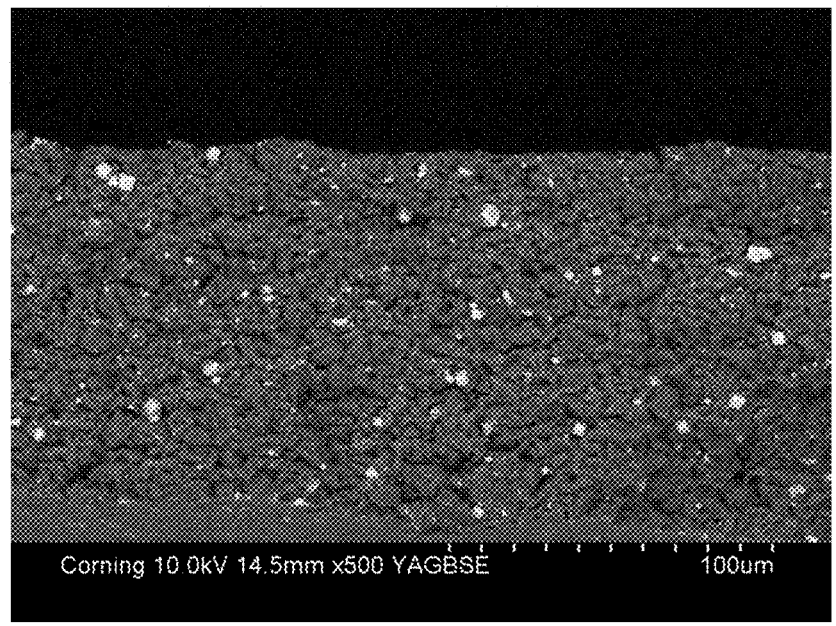
FIGS. 3A and 3B are cross-sectional scanning electron micrographs showing zeolite particles incorporated throughout a carbon-based electrode.
Figure 3B:
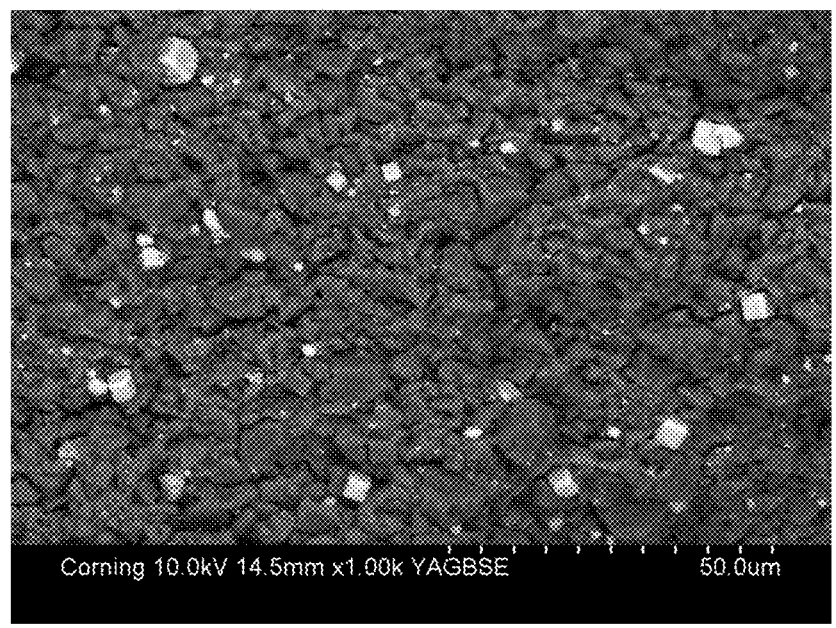

An example of a carbon-based electrode comprising 7.5 wt. % zeolite particles dispersed throughout the electrode is shown in cross-sectional scanning electron micrographs in FIGS. 3A and 3B. The size of the individual zeolite particles, which are shown as bright particles in backscatter mode, ranges from about 1 to 5 microns.

Figure 4:
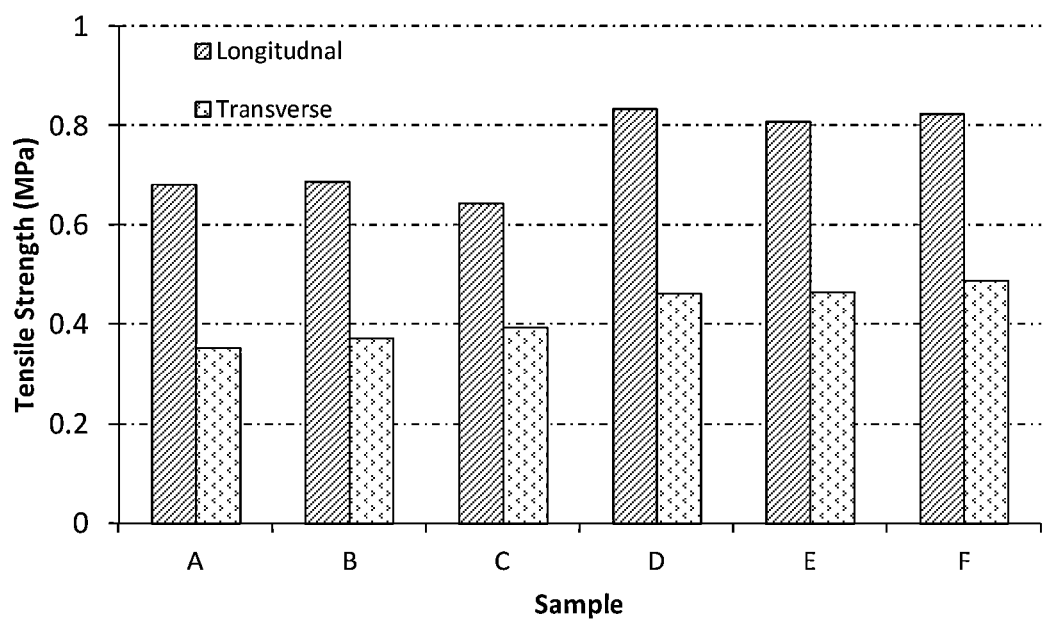
FIG. 4 is a plot of tensile strength for free-standing carbon mats that include zeolite particles.

FIG. 4 shows a plot of tensile strength in both longitudinal, i.e., rolling direction (L) and transverse, i.e., perpendicular to the rolling direction (T) for various free-standing carbon mats that were produced by calendaring. Samples A-C include a chemically-activated carbon derived from wheal flour, and samples D-F include a steam-activated carbon derived from coconut shells. Samples A and D are comparative and include 85% activated carbon, 10% PTFE and 5% carbon black (i.e., 0% molecular sieves). Samples B and E include 81.5% activated carbon, 10% PTFE, 5% carbon black and 3.5% zeolite. Samples C and F include 78% activated carbon, 10% PTFE, 5% carbon black and 7% zeolite. With respect to the respective baseline samples A and D, it can be seen that the incorporation of 3.5 wt. % zeolite or even 7 wt. % zeolite into the electrode matrix does not substantially degrade the mechanical integrity of the carbon mat.

In embodiments, the free standing carbon layer is laminated onto one or both sides of a conductive current collector. The current collector can be, for example, a 15-25 μm (e.g., 20 micron) thick aluminum foil that is optionally pre-coated with a layer of conductive carbon such as carbon ink (e.g., DAG EB012 conductive coating from Henkel or thermally-grown carbon. Particularly with respect to commercially-available conductive inks, which may contain about 5 wt. % organic binder, thermally grown carbon is free or substantially free of organic content and contain fewer transition metal contaminants, which can aid in minimizing unwanted Faradic reactions. In embodiments, the conductive carbon layers have an organic content of less than 0.5 wt. %.

Lamination may be performed at elevated temperature, e.g., about 200° C. The laminated electrodes are cut to the appropriate dimensions and wound into a jelly roll together with cellulosic separator paper (NKK TF4030). The current collector ends are smeared and laser welded to terminals. The assembly is then packaged into an aluminum can and sealed. The resulting cell is dried in vacuum at 130° C. for 48 hrs. Electrolyte is filled into the cell, and the cell is sealed.

As noted above, further embodiments relate to the formation of a layer of molecular sieve particles rather than dispersing the molecular sieve particles throughout the carbon mat. In embodiments where molecular sieve particles are incorporated onto a surface of a carbon-based electrode, the molecular sieve layer can be formed to a thickness of from 5 to 50 microns, e.g., 5, 10, 15, 20, 25, 30, 35, 40, 45 or 50 microns, including thickness values that form a range between any pair of the foregoing values. In such an approach, a layer comprising activated carbon, carbon black and a binder can be formed on a current collector surface and a layer of molecular sieve particles can then be formed over a surface of the carbon-based electrode.

Such a molecular sieve layer may optionally include a binder. A binder, if included, may comprise up to about 20 wt. % of the total molecular sieve layer, e.g., less than 15 wt. % or less than 10 wt. %. A fraction of the molecular sieve particles that are incorporated into a layer over a surface of a carbon-based electrode may penetrate into the surface of the electrode.

Figure 5A:
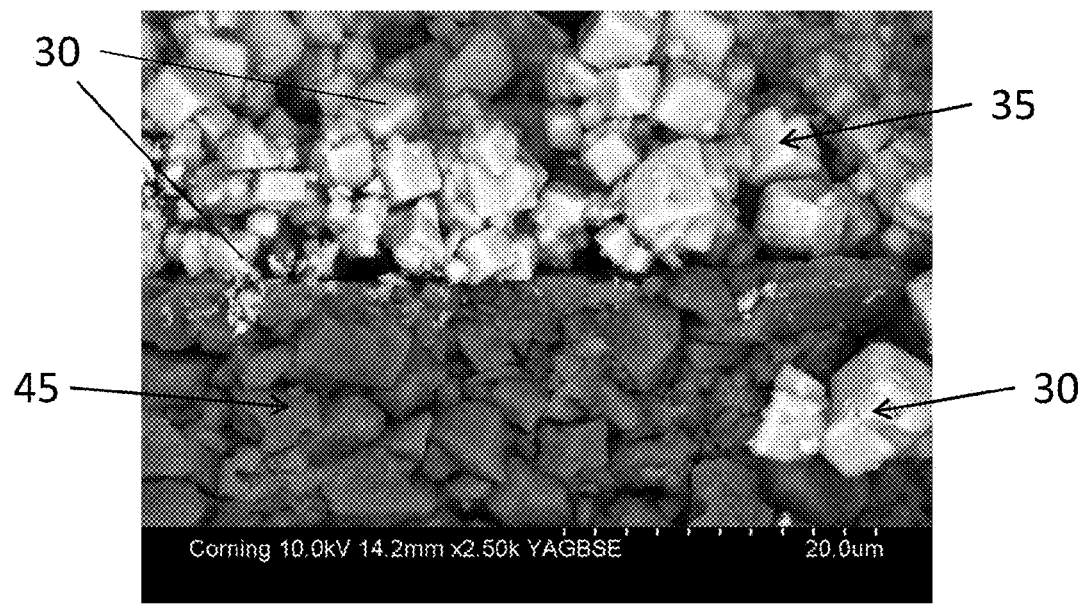
FIGS. 5A and 5B are cross-sectional scanning electron micrographs showing a layer of zeolite particles formed over a surface of a carbon-based electrode.
Figure 5B:
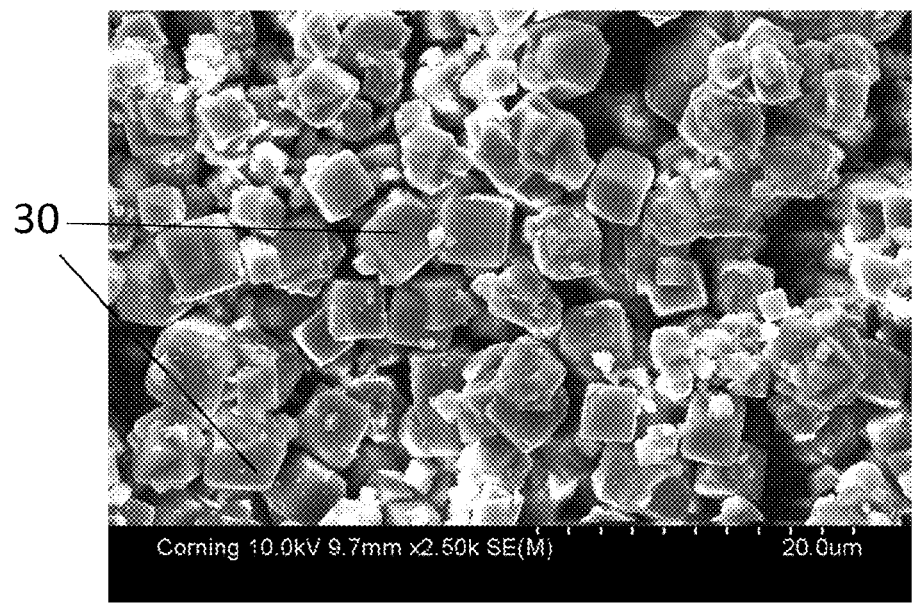

An example of a carbon-based electrode comprising a 25 micron thick layer of zeolite particles is shown in cross-sectional scanning electron micrographs in FIGS. 5A and 5B. In FIG. 5A, zeolite particles 30 form a layer 35 over carbon-based electrode 45. As shown, some of the zeolite particles penetrate and are embedded in layer 45. FIG. 5B is an image showing individual zeolite particles 30 within the layer 35. The size of the individual zeolite particles, which are shown as bright particles in backscatter mode, ranges from about 1 to 5 microns.

The structure comprising a layer of molecular sieve particles disposed adjacent to a surface of a carbon-based electrode can be wound together with a separator and packaged together with a suitable electrolyte to form an EDLC as described above. In a typical jelly-roll, two carbon-based electrodes are wound with a pair of interposed separators.

The present disclosure also relates to an electrochemical device, such as an electrochemical double layer capacitor (EDLC), comprising at least one carbon-based electrode that includes the molecular sieve material described herein.

Ultracapacitors typically comprise two porous electrodes that are isolated from electrical contact with each other by a porous dielectric separator. The separator and the electrodes are impregnated with an electrolytic solution that allows ionic current to flow between the electrodes while preventing electronic current from discharging the cell. Each porous electrode is typically in electrical contact with a current collector. The current collector, which can comprise a sheet or plate of electrically-conductive material (e.g., aluminum), can reduce ohmic losses while providing physical support for the porous electrode (activated carbon) material, i.e., the carbon mat.

According to embodiments, an electrochemical cell comprises a first carbon-based electrode and a second carbon-based electrode arranged within a casing, wherein each carbon-based electrode includes a current collector having opposing first and second major surfaces, a first conductive layer is formed over the first major surface, a second conductive layer is formed over the second major surface, and a first carbon-based layer and a second carbon-based layer each comprising activated carbon, carbon black and binder are formed over respective ones of the first and second conductive layers. In related embodiments, a layer comprising molecular sieve particles is disposed adjacent to at least one of the first carbon-based layer or the second carbon-based layer, and/or molecular sieve particles are incorporated uniformly or non-uniformly throughout at least one of the first carbon-based layer or the second carbon-based layer.

Molecular sieve material may be incorporated into either the positive or negative electrode of such a cell. In related embodiment, molecular sieve material may be incorporated into both the positive and negative electrodes of an electrochemical cell.

Figure 6:
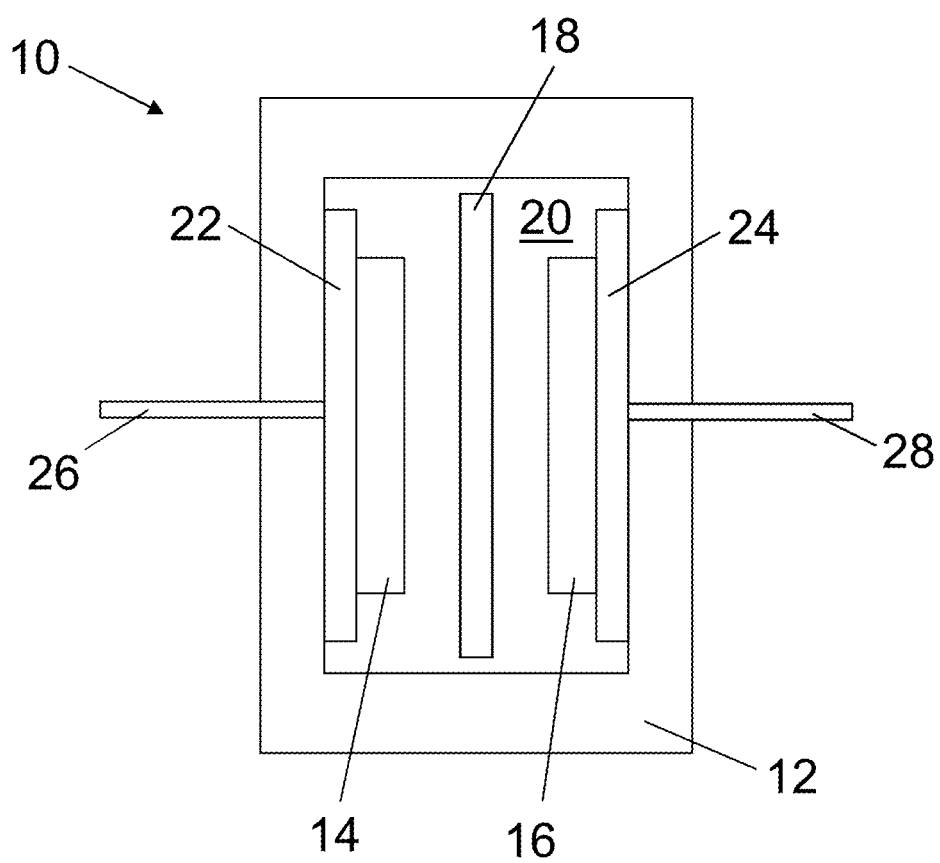
FIG. 6 is a schematic illustration of an example ultracapacitor.

FIG. 6 is a schematic illustration of an example ultracapacitor. Ultracapacitor 10 includes an enclosing body 12, a pair of current collectors 22, 24, a first carbon mat 14 and a second carbon mat 16 each respectively disposed adjacent to one of the current collectors, and a porous separator layer 18. Electrical leads 26, 28 can be connected to respective current collectors 22, 24 to provide electrical contact to an external device. Layers 14, 16 may comprise activated carbon, carbon black and a binder. A liquid electrolyte 20 is contained within the enclosing body and incorporated throughout the porosity of both the porous separator layer and each of the porous electrodes. In embodiments, individual ultracapacitor cells can be stacked (e.g., in series) to increase the overall operating voltage.

The enclosing body 12 can be any known enclosure means commonly-used with ultracapacitors. The current collectors 22, 24 generally comprise an electrically-conductive material such as a metal, and commonly are made of aluminum due to its electrical conductivity and relative cost. For example, current collectors 22, 24 may be thin sheets of aluminum foil.

Porous separator 18 electronically insulates the electrodes from each other while allowing ion diffusion. The porous separator can be made of a dielectric material such as cellulosic materials, glass, and inorganic or organic polymers such as polypropylene, polyesters or polyolefins. In embodiments, a thickness of the separator layer can range from about 10 to 250 microns.

The electrolyte 20 serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. patent application Ser. No. 13/682,211, the disclosure of which is incorporated herein by reference. Example quaternary ammonium salts include tetraethylammonium tetrafluoroborate (($Et)_4NBF_4$) or triethylmethyl ammonium tetrafluoroborate ($Me(Et)_3NBF_4$).

Example solvents for the electrolyte include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. In embodiments, the electrolyte includes a polar aprotic organic solvent such as a cyclic ester, chain carbonate, cyclic carbonate, chain ether and/or cyclic ether solvent. Example cyclic esters and chain carbonates have from 3 to 8 carbon atoms, and in the case of the cyclic esters include β-butyro-lactone, γ-butyrolactone, γ-valerolactone and δ-valerolactone. Examples of the chain carbonates include dimethyl carbonate, diethyl carbonate, dipropyl carbonate, ethylene carbonate, methyl ethyl carbonate, methyl propyl carbonate and ethyl propyl carbonate. Cyclic carbonates can have from 5 to 8 carbon atoms, and examples include 1,2-butylene carbonate, 2,3-butylene carbonate, 1,2-pentene carbonate, 2,3-pentene carbonate and propylene carbonate. Chain ethers can have 4 to 8 carbon atoms. Example chain ethers include dimethoxyethane, diethoxyethane, methoxyethoxyethane, dibutoxyethane, dimethoxypropane, diethoxypropane and methoxyethoxypropnane. Cyclic ethers can have from 3 to 8 carbon atoms. Example cyclic ethers include tetrahydrofuran, 2-methyl-tetrahydrofuran, 1,3-dioxolan, 1,2-dioxolan, 2-methyldioxolan and 4-methyldioxolan. A combination of two or more solvents may also be used.

As examples, an assembled EDLC can comprise an organic liquid electrolyte such as tetraethylammonium tetrafluoroborate (TEA-TFB) or triethylmethylammonium tetrafluoroborate (TEMA-TFB) dissolved in an aprotic solvent such as acetonitrile.

Ultracapacitors may have a jelly roll design, prismatic design, honeycomb design, or other suitable configuration. A carbon-based electrode made according to the present disclosure can be incorporated into a carbon-carbon ultracapacitor or into a hybrid ultracapacitor. In a carbon-carbon ultracapacitor, both of the electrodes are carbon-based electrodes. In a hybrid ultracapacitor, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

In carbon-carbon ultracapacitors, the activated carbon in each electrode may have the same, similar or distinct properties. For example, the pore size distribution of the activated carbon incorporated into a positive electrode may be different than the pore size distribution of the activated carbon incorporated into a negative electrode.

The activated carbon used in conjunction with the carbon-based electrodes disclosed herein can have a specific surface area greater than about 300 $m^2/g$, i.e., greater than 350, 400, 500 or 1000 $m^2/g$. In embodiments, the average particle size of the activated carbon can be milled to less than 20 microns, e.g., about 5 microns, prior to incorporating the activated carbon into a carbon-based electrode.

Within an individual ultracapacitor cell, and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrode to generate an electrode potential.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices.

The amount of charge stored in the layers impacts the achievable energy density and power density of the capacitor. The performance (energy and power density) of an ultracapacitor depends largely on the properties of the activated carbon that makes up the electrodes. The properties of the activated carbon, in turn, can be gauged by evaluating, for example, the porosity and pore size distribution of the activated carbon, as well as the impurity content within the activated carbon, such as nitrogen or oxygen. Relevant electrical properties include the potential window, area-specific resistance and the volumetric capacitance.

Ultracapacitors comprising activated carbon and molecular sieve particles may, in some embodiments, exhibit operating voltages up to 3.2 V (e.g., 2.7, 2.8, 2.9, 3.0, 3.1 or 3.2V) and a volumetric capacitance of greater than 50 $F/cm^3$ (e.g., greater than 50, 60, 70, or 80 $F/cm^3$), including capacitance values between any of the foregoing values. Ultracapacitors comprising activated carbon and molecular sieve particles may include one or more carbon-based electrodes that include PVDF binder. The high potential window is believed to be the result of the low reactivity of the activated carbon, which may be attributable to a low concentration of water within the material and/or the PVDF.

Various embodiments will be further clarified by the following examples.

EXAMPLES

Example 1

Activated Carbon Thin Film Electrodes
(Comparative)

Activated carbon thin films were made by grinding activated carbon powder (YP-50F, Kuraray Co., Ltd.), carbon black (Black Pearl 2000, Cabot Corporation.) and PTFE binder (601A, DuPont Inc.) at a ratio of 85:5:10 by weight in a rotary grinder at a speed of 350 rpm to form a mixture that was rolled into a thin sheet. A typical thickness of the activated carbon mat was about 3.7 mil.

Example 2

Activated Carbon Thin Film Electrodes with
Molecular Sieve Coating

A layer of molecular sieve material was formed over a surface of the activated carbon thin film of Example 1. A suspension of the molecular sieve particles was first formed by mixing molecular sieve particles (Alfa Aesar) and n-methyl-2-pyrrolidone (NMP) at a ratio of 1:1 by weight using a mortar. The suspension was then applied on one side of the activated carbon thin film using a pipette. The resulting film was dried in a fume hood for 30 min and diced into discs having a diameter of 1.4 cm. The electrode films were then rolled through a roller press. As a result of the rolling, some molecular sieve particles from the layer penetrated into the carbon mat.

The electrode discs were further dried in a 150° C. vacuum oven overnight. The thickness of molecular sieve layer was about 33 microns. The molecular sieve layer accounted for about 21.7% by weight of the activated carbon-based electrode (exclusive of the current collector).

Example 3

Activated Carbon Thin Film Electrodes with
Integrated Molecular Sieve Material

Activated carbon thin films were made by grinding activated carbon powder (YP-50F, Kuraray Co., Ltd.), carbon black (Black Pearl 2000, Cabot Corporation.), PTFE binder (601A, DuPont Inc.), and molecular sieve particles (Alfa Aesar) at a ratio of 83:1.5:8:7.5 by weight in a rotary grinder at a speed of 350 rpm to form a mixture that was rolled into a thin sheet (carbon mat). A typical thickness of the activated carbon layer was about 3.7 mil. Electrodes were formed by dicing the film into discs with a diameter of 1.4 cm. The carbon-based electrodes included particles of the molecular sieve material dispersed throughout the carbon mat.

Performance of the comparative and molecular sieve-containing activated carbon-based electrodes was evaluated by incorporating the electrodes into coin cells. Test cell fabrication was carried out in a dry glove box purged with argon gas. Symmetric test cells corresponding to the Example 1-3 carbon based electrodes were assembled.

The test cells were fabricated by stacking the cell components into an Al-clad (CR2032) coin cell. A positive electrode comprising an activated carbon film laminated onto a carbon conductive paper (CFP) current collector was initially placed in the cell. A cellulose paper separator (25 micron thickness) was laid over top of the activated carbon film, followed by the negative electrode with a CFP current collector. A few drops of electrolyte (1.2M $Et_4NBF_4$ in ACN) were added after placing each of the positive electrode, separator and negative electrode into the cell. The electrolyte solution included about 500 ppm $H_2O$. A top of the coin cell was placed over the resulting stack and the cell was sealed using a crimping machine.

Thus, in the foregoing samples, the activated carbon films (positive and negative electrodes) were either (i) a comparative structure that included activated carbon, carbon black, and binder, (ii) an Example 2 structure that included a layer of molecular sieve material disposed adjacent to each carbon film, or (iii) an Example 3 structure that included molecular sieve particles incorporated throughout the activated carbon films.

Cell performance measurements were conducted using a Gamry Instruments potentiostat/galvostat with Framework 5 software. Impedance experiments were carried out at a DC voltage of 0V with an amplitude of 10 mV. The frequency ranged from 10 kHz to 0.01 Hz. Cyclic voltammetry experiments were conducted at a scanning rate of 5 mV/s with different vertex voltage.

In a first series of tests, a test cell comprising the comparative Example 1 electrode was evaluated along with a test cell comprising the molecular sieve-coated activated carbon electrodes of Example 2. The results are shown in FIGS. 7-10. In FIGS. 7-10, curve 1 corresponds to Example 1, curve 2 corresponds to Example 2, and curve 3 corresponds to Example 3.

Figure 7:
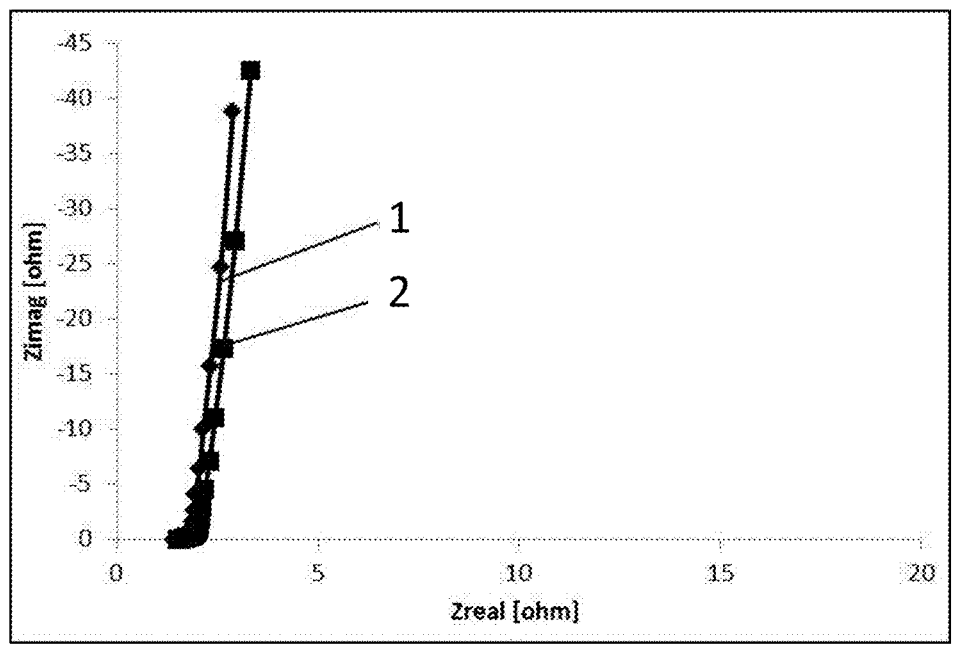
FIG. 7 is a pair of Nyquist plots for coin cells comprising carbon-based electrodes with and without a layer of zeolite particles formed over a surface of the electrode.

FIG. 7 shows a comparison of Nyquist plots of coin cells with and without the molecular sieve coating. The equivalent series resistance (ESR) for each test cell was about 1.5Ω. This indicates that the ESR did not significantly increase due to the introduction of molecular sieve coating. Thus, there should thus be no appreciable reduction in power of the cell due to the molecular sieve coating.

Figure 8:
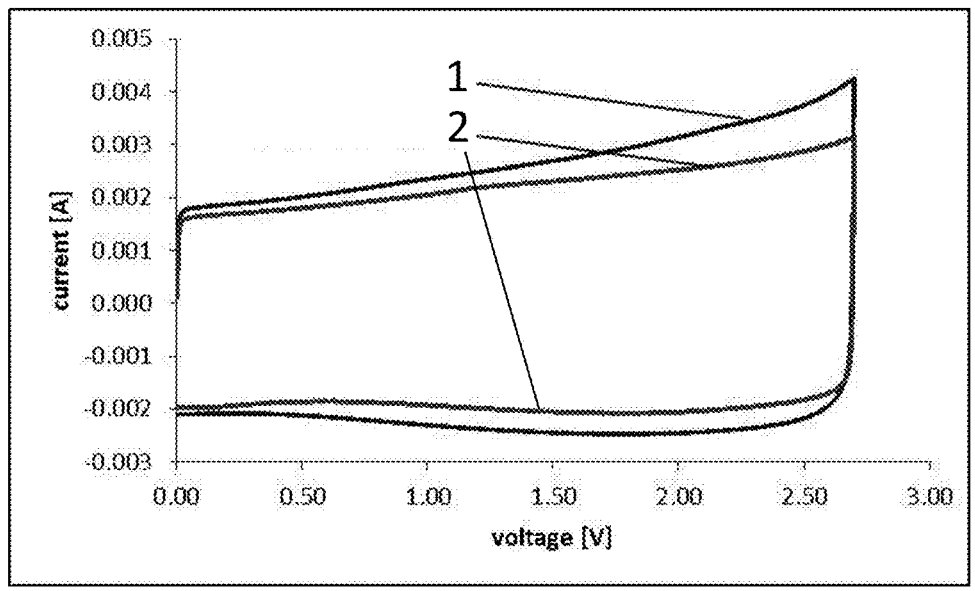
FIG. 8 is a plot of current versus voltage for the coin cells of FIG. 7.

FIG. 8 shows the corresponding voltammogram traces. The comparative cell (Example 1, curve 1) shows extensive reactions related to water decomposition. These irreversible reactions lead to distortions in the voltammogram.

The Example 2 cell comprising the molecular sieve coating (curve 2) exhibits a voltammogram curve with close to rectangular shape. This indicates that irreversible reactions during charging, especially electrolysis reaction of trace water, is minimized or eliminated. Thus, the molecular sieve coating can significantly minimize the effect of water contamination on the performance of ultracapacitors. It also minimizes gas generation and improves the cycle life of the cell.

Figure 9:
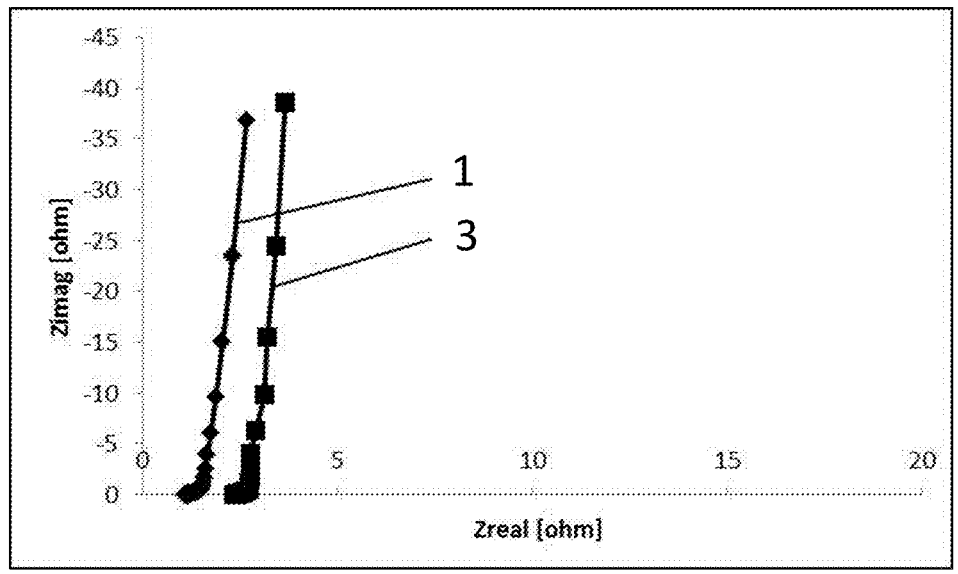
FIG. 9 is a pair of Nyquist plots for coin cells comprising carbon-based electrodes having zeolite particles dispersed throughout the electrode.
Figure 10:
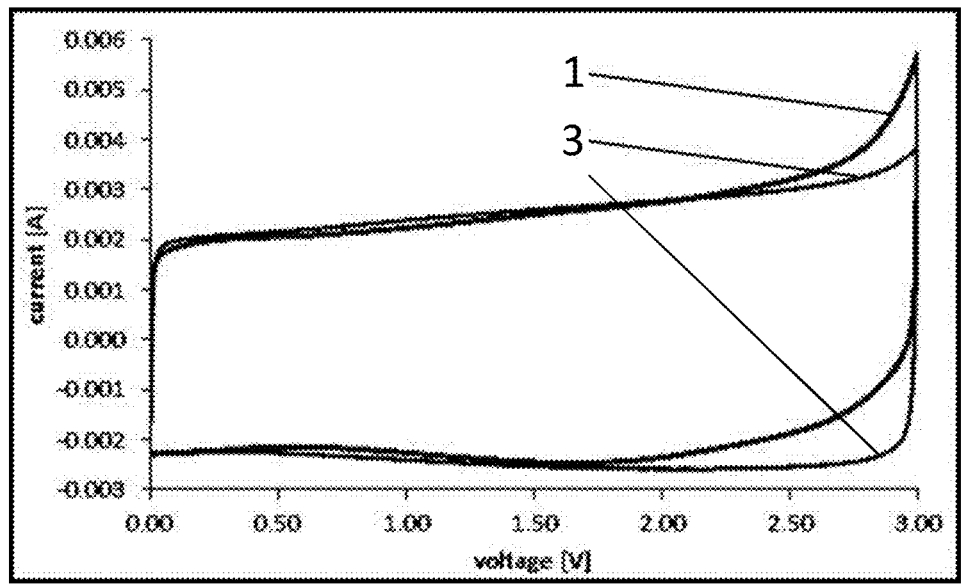
FIG. 10 is a plot of current versus voltage for the coin cells of FIG. 9.

Turning to FIGS. 9 and 10, FIG. 9 compares the Nyquist plots of coin cells with and without molecular sieve particles incorporated throughout the carbon-based electrode. It can be seen that the cell with molecular sieve material (Example 3, curve 3) has a slightly higher ESR, though further optimization of the electrode composition and process can eliminate the difference. The incorporation of the molecular sieve material into the electrode does not significantly affect the power capability.

FIG. 10 shows a comparison of the corresponding voltammograms traces. As with Example 2, the Example 3 carbon-based electrode shows much better capacitive behavior at a vertex voltage of 3.0V than a conventional (example 1) cell. The water decomposition and other irreversible reactions that contribute to distortion of the trace for the standard cell are minimized in the molecular sieve-containing carbon-based electrode.

It is clear from the data in Examples 1-3 that incorporation of molecular sieve material into the structure of the electrode or on a surface of the electrode as a coating can lead to minimization of the effects of water, thus improving the performance of the capacitor and leading to higher performance.

Example 4

Figure 11:
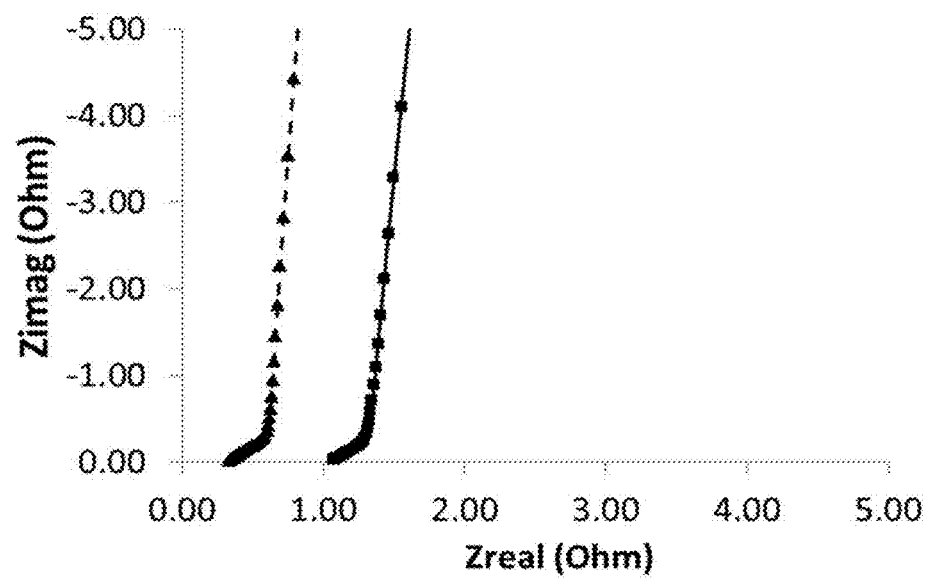
FIG. 11 is a pair of Nyquist plots for coin cells comparing an ink-based conductive layer with a thermally-grown conductive layer.

Zeolite-Free Carbon-Based Electrodes with Ink-Based and Thermally-Grown Conductive Carbon Layers ESR data illustrating the effect of a thermally-grown conductive carbon layer (dotted line) in place of an ink-based conductive carbon layer (solid line) is shown in FIG. 11. The carbon mats included a comparison composition of 90 wt. % activated carbon, 5 wt. % PVDF and 5 wt. % carbon black. As seen with reference to FIG. 11, the ESR for the current collector comprising the thermally-grown conductive carbon is significantly lower than the ESR for the ink-based current collector, which is believed to be the result of the absence of a binder and the resulting high-purity interface associated with the thermally-grown carbon. The equivalent series resistance of the current collector comprising the thermally-grown conductive carbon is 0.33 Ohm. The equivalent series resistance of the current collector comprising the ink-based conductive carbon layer is 1.07 Ohm.

Example 5

Figure 12:
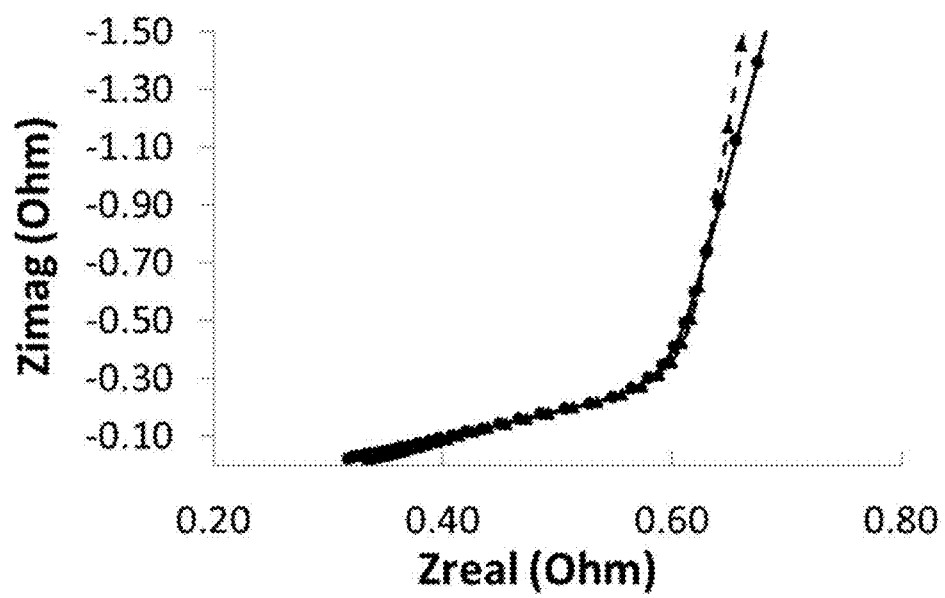
FIG. 12 is a pair of Nyquist plots for coin cells comprising carbon-based electrodes with and without zeolite particles dispersed throughout the electrode.

Zeolite-Containing and Zeolite-Free Carbon-Based Electrodes in Conjunction with Thermally-Grown Conductive Carbon Layers The ESR data in FIG. 12 show no significant difference between zeolite-containing and zeolite-free carbon-based electrodes when used in conjunction with thermally-grown conductive carbon layers. In FIG. 12, the zeolite-free electrode (solid line) includes 90 wt. % activated carbon, 5 wt. % PVDF and 5 wt. % carbon black, while the zeolite-containing electrode (dashed line) includes 85 wt. % activated carbon, 5 wt. % PVDF, 5 wt. % carbon black and 5 wt. % zeolite particles. The equivalent series resistance of the zeolite-free electrode is 0.32 Ohm and the equivalent series resistance of the zeolite-containing electrode is 0.33 Ohm.

Example 6

Figure 13:
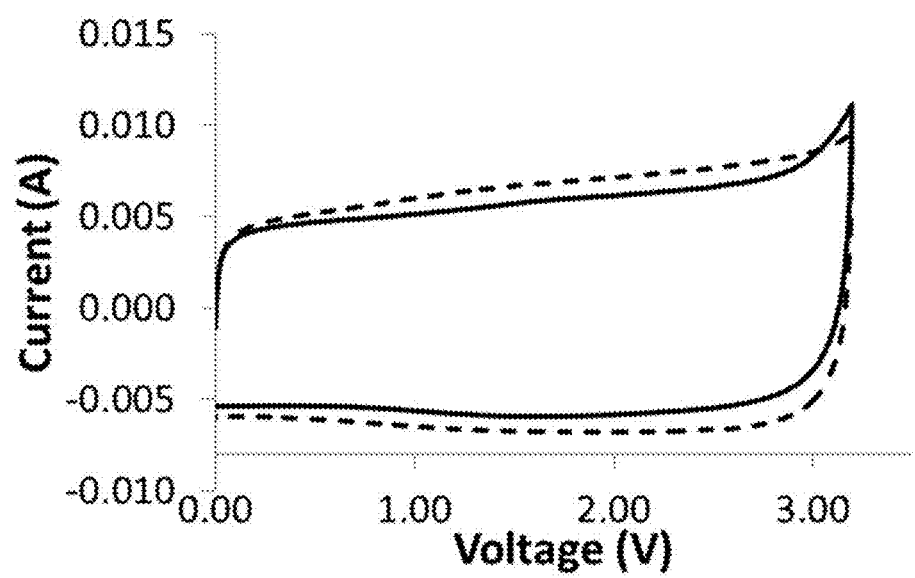
FIG. 13 is a plot of current versus voltage for a zeolite-free electrode with an ink-based conductive layer and a zeolite-containing electrode with a thermally-grown carbon conductive layer.

Zeolite-Free Carbon-Based Electrode with Ink-Based Conductive Carbon Layer and Zeolite-Containing Carbon-Based Electrodes with Thermally-Grown Conductive Carbon Layer The CV curves in FIG. 13 illustrate the difference voltage response for a comparative zeolite-free carbon-based electrode having an ink-based conductive carbon layer (solid line) and a 5 wt. % zeolite-containing carbon-based electrode with a thermally-grown conductive carbon layer. As seen, the thermally-grown carbon current collector shows better capacitive behavior than the conventional baseline.

The data in Examples 4-6 illustrate the beneficial results associated with the use of PVDF as a binder in the carbon-based electrode. Also evident are the positive effects of using a thermally-grown carbon conductive layer, particularly as a replacement for carbon ink.

In conjunction with embodiments disclosed herein, an EDLC with a molecular sieve-containing carbon-based electrode can exhibit higher voltage operation than comparative devices having conventional electrodes, leading to higher energy density. The currently-disclosed approach provides an EDLC that is robust with respect to water exposure, and does not require complex drying methods such as electrolysis, or high temperature drying methods, which may otherwise degrade the cell.

The water-absorbing molecular sieve particles capture water, which reduces the kinetics of the Huffman degradation chain reaction and the attendant build-up of gases that may lead to cell failure or performance drop.

Disclosed herein are new electrode configurations and related methods of manufacture for a high-voltage EDLC product. The electrodes include one or more of (i) a water adsorbing component, (ii) PVDF binder, and (iii) a thermally-grown carbon interface between the carbon mat and the current collector. A slurry-based process can be used to form molecular sieve-containing and/or PVDF binder-containing carbon-based electrodes. A thermally-grown carbon coating provides a binder-less layer and high purity interface that is free of transitional metal contaminants.

While current state-of-the-art EDLCs operate in a range of 2.3-2.7 V, such devices are limited by the stability of materials and, in particular, Faradic reactions that are catalyzed by the presence of water and transition metal contaminants in the cell. The disclosed electrodes enable higher voltage (>3V) operation.

As used herein, the singular forms "a," "an" and "the" include plural referents unless the context clearly dictates otherwise. Thus, for example, reference to a "molecular sieve" includes examples having two or more such "molecular sieves" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to carbon-based electrode that comprises activated carbon, carbon black, binder and a molecular sieve material include embodiments where a carbon-based electrode consists of activated carbon, carbon black, binder and a molecular sieve material as well as embodiments where such an electrode consists essentially of activated carbon, carbon black, binder and molecular sieve material.

It will be apparent to those skilled in the art that various modifications and variations can be made without departing from the spirit and scope of the disclosure. Since modifications, combinations, sub-combinations and variations of the disclosed embodiments may occur to persons skilled in the art, the disclosure should be construed to include everything within the scope of the appended claims and their equivalents.

We claim:

1. A carbon-based electrode comprising:
   a current collector having opposing first and second major surfaces;
   a first conductive layer disposed adjacent to the first major surface;
   a second conductive layer disposed adjacent to the second major surface; and
   a first carbon-based layer and a second carbon-based layer each comprising activated carbon, carbon black and binder disposed adjacent to respective ones of the first and second conductive layers; and
   (i) a layer comprising at least one molecular sieve material and a binder disposed adjacent to at least a portion of at least one of the carbon-based layers, or
   (ii) at least one molecular sieve material incorporated throughout at least one of the carbon-based layers, or both (i) and (ii).

2. The carbon-based electrode according to claim 1, wherein the layer of molecular sieve material is disposed directly adjacent to at least a portion of at least one of the carbon-based layers.

3. The carbon-based electrode according to claim 1, wherein the first and second conductive layers comprise conductive carbon and the conductive layers have an organic content of less than 0.5 wt. %.

4. The carbon-based electrode according to claim 1, wherein the first and second carbon-based layers have a thickness of from 20 to 500 microns.

5. The carbon-based electrode according to claim 1, wherein the activated carbon has an average particle size of less than 20 microns.

6. The carbon-based electrode according to claim 1, wherein the binder is polyvinylidene fluoride.

7. The carbon-based electrode according to claim 1, wherein the molecular sieve material comprises synthetic or natural zeolites.

8. The carbon-based electrode according to claim 1, wherein the molecular sieve material comprises 3 A or 4 A zeolites.

9. The carbon-based electrode according to claim 1, wherein the molecular sieve material has an average particle size of 5 nm to 20 microns.

10. The carbon-based electrode according to claim 1, wherein the layer comprising molecular sieve material has a thickness of from 5 to 50 microns.

11. The carbon-based electrode according to claim 1, wherein the first and second carbon-based layers comprise 60-94.9 wt. % activated carbon, 0-10 wt. % carbon black, 5-20 wt. % binder, and 0.1-10 wt. % molecular sieve material.

12. A method of forming a carbon-based electrode, comprising:
    forming a mixture including activated carbon particles, carbon black particles, binder, molecular sieve particles, and an optional liquid; and
    forming a carbon mat from the mixture.

13. The method according to claim 12, wherein forming the mixture comprises mixing the activated carbon particles, carbon black particles, binder, molecular sieve particles and optional liquid at a temperature less than 20° C.

14. The method according to claim 12, wherein the molecular sieve particles comprise synthetic or natural zeolites.

15. The method according to claim 12, wherein the binder is polyvinylidene fluoride.

16. The method according to claim 12, wherein the mixture is calendared to form the carbon mat.

17. The method according to claim 12, further comprising laminating the carbon mat onto a substrate to form a carbon-based electrode.

18. The method according to claim 17, wherein the substrate comprises a current collector having opposing first and second major surfaces, a first conductive layer disposed adjacent to the first major surface, and a second conductive layer disposed adjacent to the second major surface.

19. The method according to claim 18, wherein the first and second conductive layers comprise conductive carbon.

20. The method according to claim 19, wherein the first and second conductive layers have an organic content of less than 0.5 wt. %.

21. The method according to claim 12, wherein the mixture comprises a slurry of the activated carbon particles, carbon black particles, binder, molecular sieve particles, and liquid.

22. An energy storage device comprising a first carbon-based electrode and a second carbon-based electrode arranged within a casing, wherein each carbon-based electrode includes:
    a current collector having opposing first and second major surfaces;
    a first conductive layer disposed adjacent to the first major surface;
    a second conductive layer disposed adjacent to the second major surface; and
    a first carbon-based layer and a second carbon-based layer each comprising activated carbon, carbon black and binder disposed adjacent to respective ones of the first and second conductive layers, wherein
    (i) a layer comprising at least one molecular sieve material and a binder is disposed adjacent to at least one of the carbon-based layers, or (ii) at least one molecular sieve material is incorporated throughout at least one of the carbon-based layers, or both (i) and (ii).

23. The device according to claim 22, wherein the binder is polyvinylidene fluoride and the first and second conductive layers comprise conductive carbon, the conductive layers having an organic content of less than 0.5 wt. %.

24. The device according to claim 22, wherein the device in an electrochemical double layer capacitor.

25. A carbon-based electrode comprising:
    a carbon-based layer including activated carbon, carbon black and binder, and
    (i) a layer comprising at least one molecular sieve material and a binder disposed adjacent to at least a portion of the carbon-based layer, or (ii) at least one molecular sieve material incorporated throughout the carbon-based layer, or both (i) and (ii).

* * * * *